O. C. DAVIS.
SHOP PAN TRUCK.
APPLICATION FILED JUNE 21, 1919.

1,363,499.

Patented Dec. 28, 1920.

Inventor:
Orin C. Davis,
By Bottum, Bottum, Hudnall & Lecher
Attorneys.

UNITED STATES PATENT OFFICE.

ORIN C. DAVIS, OF MANISTEE, MICHIGAN.

SHOP-PAN TRUCK.

1,363,499.  Specification of Letters Patent.  Patented Dec. 28, 1920.

Application filed June 21, 1919. Serial No. 305,831.

*To all whom it may concern:*

Be it known that I, ORIN C. DAVIS, a citizen of the United States, residing at Manistee, in the county of Manistee and State of Michigan, have invented certain new and useful Improvements in Shop-Pan Trucks, of which the following is a specification, reference being had to the accompanying drawing, forming a part thereof.

This invention relates more particularly to trucks for loading and transferring so called "tote boxes" or shop pans used in factories and the like, for holding and carrying from place to place, bolts, small forgings and castings or the like.

Its main objects are to facilitate the handling and conveyance of such receptacles and their contents, and to avoid wear and injury to the receptacles themselves and to the floors over which, according to the usual practice, they are dragged with hand hooks.

It consists in the construction, arrangement and combination of parts as hereinafter particularly described and pointed out in the claims.

In the accompanying drawings like characters designate the same parts in the several figures.

Figure 1:
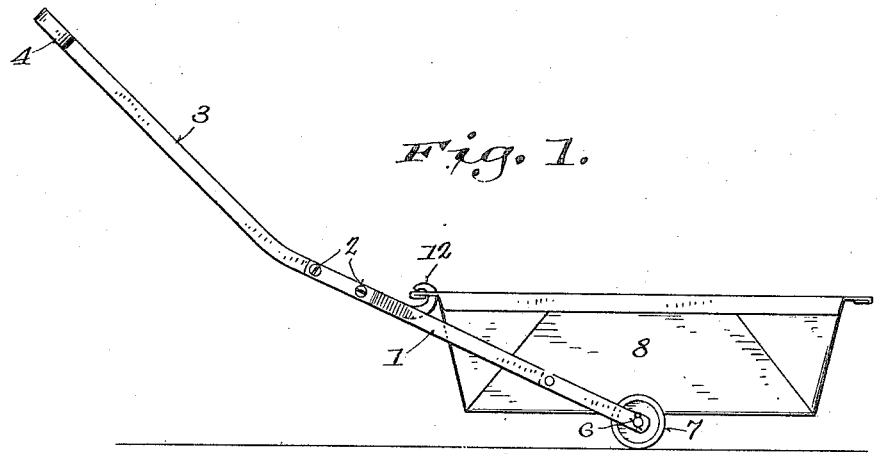
Figure 2:
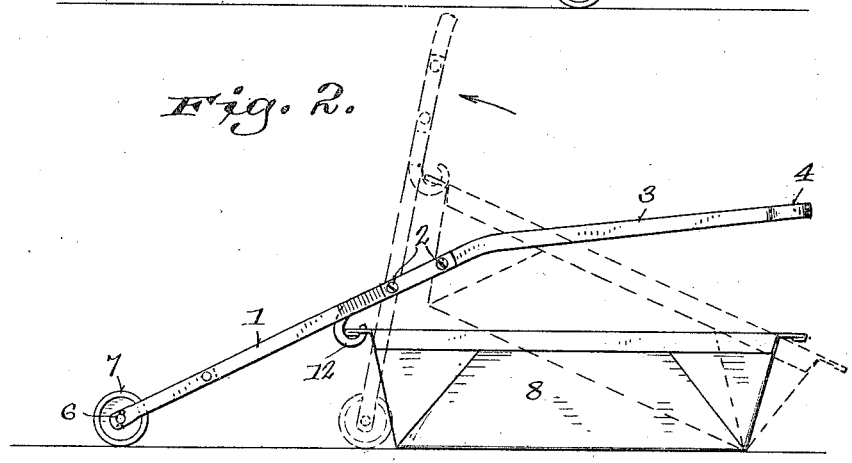
Figure 3:
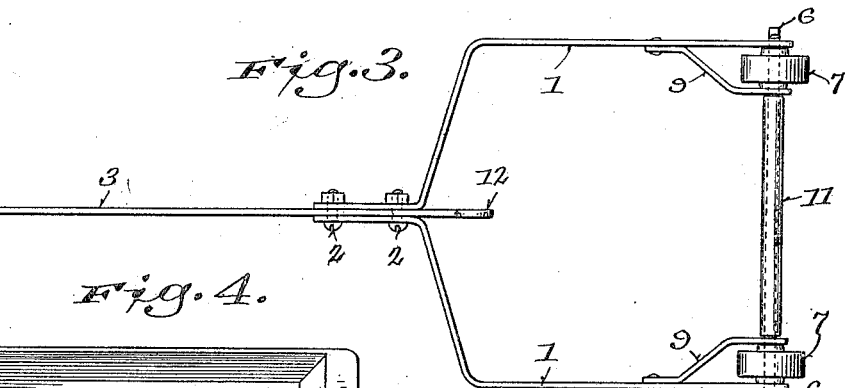
Figure 4:
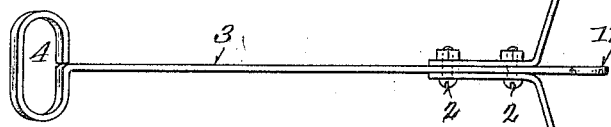
Figure 4:
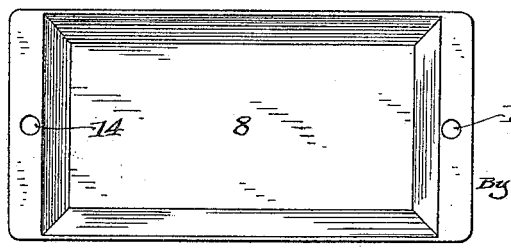

Figure 1 is a side elevation of a truck embodying the invention, engaged with and supporting a shop pan in position for transferring the same; Fig. 2 is a similar view showing the truck in position for engagement with a pan and for loading the same on the truck; Fig. 3 is a plan view of the truck; and Fig. 4 is a plan view of a shop pan with which the truck is designed to be used.

The truck is preferably constructed and as shown by the drawing, comprises a forked or open frame, which may be made of flat metal bars. As shown, the frame consists of fork arms or side members 1, which are bent inwardly at one end and are rigidly fastened as by bolts 2, to a lever and handle arm 3, provided at its outer end with a handle 4. The arm 3 is preferably bent upward, as shown in Fig. 1, to bring the handle 4 into convenient position for operating the truck in transporting a pan with its contents, and also into convenient position, as shown in Fig. 2, for engagement with and lifting the pan with its contents upon the truck.

A transverse axle or member 6, fastened at the ends in the ends of the fork arms or side members 1 of the frame, and provided adjacent its ends with wheels 7, is adapted to support a pan 8 with its bottom resting thereon, near the middle, as shown in Fig. 1.

The wheels 7 are preferably loosely mounted on the axle 6 inside of and next to the fork arms or side members 1 of the frame, and the frame is provided with guards and braces 9, fastened at one end to the fork arms or side members and extending obliquely inward therefrom to the axle 6 next to the inner sides of the wheels, as shown in Fig. 3, the axle passing through holes in the guards.

The ends of the axle which pass through the fork arms or side members 1 of the frame and the guards 9 and on which the wheels 7 are rotatably mounted, are preferably of reduced diameter, or as shown in Fig. 3, the middle portion of the axle between the guards is enlarged and reinforced by a tube or pipe 11, which serves as a spacing member to hold the fork arms or side members of the frame and the truck wheels, the proper distance apart.

The truck frame is provided with means for releasably engaging or connecting it with a pan 8 and holding it in position in the frame and on the truck axle as shown in Fig. 1, for conveyance from place to place. Such means may consist as shown, of a hook 12, which may be formed on the inner end of the arm 3, and extends inwardly and upwardly from the junction of the fork arms or side members 1 of the frame with the arm 3.

In the operation of the truck, to pick up and load a pan with its contents, thereon, the truck is placed in a position adjacent one end of the pan and the lever and handle arm are turned over the top of the pan into an inverted position as shown in Fig. 2, thus bringing the hook 12 into position for engagement with a hole 14 in the overhanging flange or rim at one end of the pan. The handle 4 is then lifted, thereby engaging the hook with the pan, and by its continued upward and outward movement in the direction indicated by an arrow in Fig. 2, the truck frame is turned into an upright position, lifting the end of the pan engaged by the hook, as indicated by dotted lines in the same figure. By the continued movement of the handle in the same direction, the axle 6 is shifted on the wheels 7 underneath the elevated end of the pan, and the truck is brought into its normal upright carrying position, the pan being lowered into place upon the axle and supported at one end by the hook, as shown in Fig. 1. As the truck frame is swung back from the position indicated by dotted lines, to the normal carrying position in which it is shown in Fig. 1, the end of the pan engaged by the hook 12 passes downward between the fork arms or side members 1, and the bottom of the pan is guided into proper position on the axle tube or pipe 11 by the inclined guards 9 which hold the sides of the pan out of contact with the truck wheels 7.

The pan with or without a load, is deposited on the floor, and the hook 12 disengaged therefrom, by a reversal of the operations above described.

Various changes in the details of construction and arrangement of parts may be made without departure from the principle and scope of the invention as defined in the following claims.

I claim:

1. In a shop pan truck the combination of an open frame comprising side members and provided at one end with a transverse pan-supporting member, and at the other end with a handle and a fastening positioned in relation to the adjacent portion of the frame for detachable engagement with a pan upon the frame being inverted, and wheels on which the frame is mounted adjacent the ends of the transverse supporting member, the truck being adapted when turned into an inverted position over a pan to be releasably engaged by said fastening with the pan, and when turned back into upright position, to lift and transfer the pan into carrying position on said supporting member.

2. In a shop pan truck the combination of an open frame comprising side members and provided at one end with a handle and a fastening for detachable engagement with a pan and at the other end with a transverse pan-supporting member mounted within the frame adjacent the ends of said supporting member, and guards extending obliquely inward from the side members of the frame toward said supporting member inside of the wheels and adapted to guide the pan into place on said supporting member and to hold it out of contact with the wheels.

3. In a shop pan truck the combination of an open frame comprising side members and provided at one end with a transverse axle and pan-supporting member and at the other end with a handle, and an inwardly and upwardly projecting hook adapted in an inverted position of the truck to be engaged with a hole in the rim of a shop pan and when the truck is turned back into upright position to lift and transfer the pan into and hold it in place on the axle, and wheels mounted on the ends of the axle.

4. In a shop pan truck the combination of an open frame comprising side members and provided at one end with a transverse axle and pan supporting member and at the other end with a handle and a fastening for releasable engagement with a pan, wheels mounted on the axle within the frame, guards and braces extending obliquely from the side members to the axle at the inner sides of the wheels, and a spacing tube surrounding the axle between the guards and braces.

In witness whereof I hereto affix my signature.

ORIN C. DAVIS.